United States Patent [19]

Picard

[11] Patent Number: 4,558,948
[45] Date of Patent: Dec. 17, 1985

[54] PROCESS AND APPARATUS FOR MEASURING WAVE SURFACE DISTORTIONS INTRODUCED BY AN OPTICAL SYSTEM

[75] Inventor: Bernard Picard, Saint Martin d'Heres, France

[73] Assignee: Commissariat a l'Energie Atomique, Paris, France

[21] Appl. No.: 439,577

[22] Filed: Nov. 5, 1982

[30] Foreign Application Priority Data

Nov. 6, 1981 [FR] France .................................. 81 20840
Apr. 30, 1982 [FR] France .................................. 82 07499
May 3, 1982 [FR] France .................................. 82 07645

[51] Int. Cl.⁴ ..................... G01M 11/02; G01M 11/00
[52] U.S. Cl. .................................. 356/124; 356/124.5; 356/349
[58] Field of Search ............. 350/358; 356/124, 124.5, 356/349

[56] References Cited

U.S. PATENT DOCUMENTS

| | | | |
|---|---|---|---|
| 3,447,874 | 6/1969 | Back ................................. | 356/124.5 |
| 3,744,039 | 7/1973 | Hrbek ................................ | 350/358 |
| 3,930,732 | 1/1976 | Holly ................................. | 356/124.5 |
| 4,299,490 | 11/1981 | Cahill et al. ......................... | 356/350 |
| 4,326,778 | 4/1982 | Berg et al. ............................ | 350/358 |

OTHER PUBLICATIONS

"Cube Corner Retroflector Test and Analysis", Zurasky, *Applied Optics*, Feb. 1976, p. 445.

*Primary Examiner*—R. A. Rosenberger
*Assistant Examiner*—Michael Vollero
*Attorney, Agent, or Firm*—Oblon, Fisher, Spivak, McClelland & Maier

[57] ABSTRACT

The invention relates to an apparatus for measuring the wave surface distortions introduced by a lens, comprising a source which emits coherent light of frequency $\nu o$; means for creating a reference beam and a measuring beam; a Bragg cell receiving and transmitting said beams, excited by a radio-frequency wave of frequency f emitted by a generator, the reference beam transmitted having the frequency $\nu o$ and the measuring beam diffracted by the cell having a frequency $\nu o + f$; means for transmitting the beams from the cell to the lens to be tested; detection means transforming the light signal from the lens into an electrical signal of frequency f and whereof the phase is characteristic of the wave surface distortions introduced by the lens; and means for measuring the phase displacement between the phase of the electrical signal from the detection means and the phase of an electrical signal corresponding to the radio-frequency waves.

33 Claims, 6 Drawing Figures

PROCESS AND APPARATUS FOR MEASURING WAVE SURFACE DISTORTIONS INTRODUCED BY AN OPTICAL SYSTEM

BACKGROUND OF THE INVENTION

The present invention relates to an apparatus and to a process making it possible to measure wave surface distortions introduced by an optical system and particularly by an objective or lens. These distortions are mainly linked with the transfer function of the optical system in coherent illumination. This measurement is performed on the basis of the study of the transmission, by the optical system, of coherent and sine light waves.

The principles of such a measurement will now briefly be described. In coherent light, the image of a sinusoidal intensity distribution, supplied by an optical system, is a sinusoidal intensity distribution of the same amplitude, but of different phase. The phase of the image sinusoidal distribution is dependent on the transmission quality of the optical system. This phase $\phi(\nu)$ which defines the transfer function of the optical system in coherent illumination is dependent on a coefficient $\Delta(\nu)$, which characterizes the wave surface distortions introduced by the optical system and which, itself, depends on the spatial frequency $\nu$ of the light wave.

The definition of the coefficient $\Delta(\nu)$ is illustrated in FIG. 1, in which $\Sigma_o$ and $\Sigma$ effectively represent the reference wave surface and the real wave surface of the light wave transmitted by the optical system. In the case of a perfect optical system, i.e. without aberrations, the wave surface $\Sigma$ and the wave surface $\Sigma_o$ would coincide. The reference wave surface $\Sigma_o$ can be defined as the sphere centered on image point A and tangential to the exit pupil P of the optical system.

The straight line d forms an angle $\theta$ with axis x representing the propagation direction of the light wave. This line d intersects the reference wave surface $\Sigma_o$ at a point I and the real wave surface $\Sigma$ at a point J. The algebraic value $\overline{IJ}$ represents the coefficient $\Delta(\nu)$.

For a given light wave length $\lambda$, the spatial frequency $\nu$ of the wave transmitted by the optical system is defined by the relation $\nu = (\sin \theta)/\lambda$ and the phase $\phi(\nu)$ of this wave by $$\rho(\nu) = \frac{2\pi\Delta(\nu)}{\lambda}.$$

The known apparatuses do not permit direct determination of the coefficient $\Delta(\nu)$ of the optical system and consequently directly determine the wave surface distortions introduced by it. The determination of these distortions by means of the prior art apparatus is very difficult to perform.

BRIEF SUMMARY OF THE INVENTION

The present invention relates to an apparatus and to a process making it possible to obviate these disadvantages. It has a simpler realisation and makes it possible to directly determine the wave surface distortions introduced by an optical system.

More specifically, the present invention relates to an apparatus making it possible to measure the wave surface distortions introduced by an optical system and comprising at least one lens, wherein it also comprises means making it possible to emit a main monochromatic and coherent light beam; a Bragg cell able to receive at least one beam from the emission means, said cell being excited by radio-frequency waves emitted by a radio-frequency generator, so as to emit a reference beam and a measuring beam having different time frequencies; means making it possible to transmit the reference beam and the measuring beam, emitted by the Bragg cell, in the direction of the optical system to be tested; detection means able to transform the light signal from the optical system into an electrical signal of frequency equal to the difference of the time frequencies of the beams emitted by the Bragg cell and whose phase is characteristic of the wave surface distortions introduced by said system; and means making it possible to measure the phase displacement between the phase of the electrical signal emitted by the detection means and the phase of an electrical signal corresponding to the radio-frequency waves used for exciting the Bragg cell.

Contrary to the known apparatus, the apparatus according to the invention makes it possible to directly determine distortions of the wave surface introduced by an optical system, which can be a simple lens or objective. This determination is performed in a simple and precise manner, because the measurement of the phase displacement between the two electrical signals is a simple measurement, which can be carried out very accurately. Moreover, the simplicity of the measurement is based on the use of monochromatic, coherent light.

It should be noted that, contrary to the prior art apparatus, the apparatus according to the invention has no moving mechanical element.

According to a first variant of the apparatus according to the invention, the Bragg cell is excited by two radio-frequency waves of different frequencies, so as to produce the reference beam and the measuring beam by diffraction of the main beam.

According to a second variant of the apparatus according to the invention, it comprises means making it possible to split the main beam into a reference beam and a measuring beam and the Bragg cell is excited by a single radio-frequency wave, so as to directly transmit the reference beam and transmit the measuring beam by diffraction.

According to a preferred embodiment of the invention, the apparatus also comprises a slot in the image plane of the optical system to be detected.

According to another preferred embodiment of the apparatus according to the invention, it also comprises a prism in the form of a corner cube located in the image plane of the optical system to be tested, which makes it possible to reflect the reference beam and the measuring beam towards the detection means, the direction of the reflected reference beam and the direction of the reflected measuring beam being respectively opposite to the direction of the incident reference beam and the direction of the incident measuring beam.

On using two radio-frequency waves for exciting the Bragg cell, the frequency difference between the frequency of one of the radio-frequency waves and the frequency of the other radio-frequency wave can be constant. This constant difference leads to the transmission of an electrical signal, by the detection means, whose phase is equal to $d\phi(\nu)/d\nu$ where $\phi(\nu)$ represents the wave surface distortions due to the optical system to be tested and $\nu$ the optical frequency of the light signal. The apparatus then comprises, following the measuring means, means able to integrate the signal supplied by the measuring means in order to obtain the characteristic phase of said distortions.

According to a preferred embodiment of the apparatus according to the invention, the radio-frequency generator either emits two variable frequencies, or two fixed frequencies.

According to a preferred embodiment of the apparatus according to the invention, the means making it possible to supply reference and measuring beams in the direction of the optical system to be tested are constituted by at least one convergent lens and a deflection system.

According to another preferred embodiment of the apparatus according to the invention, the means emitting the main beam of monochromatic, coherent light are constituted by a laser.

The invention also relates to a process for measuring wave surface distortions introduced by an optical system, wherein it comprises:

(a) directing onto a Bragg cell at least one monochromatic, coherent light beam, said cell, excited by radio-frequency waves emitted by the radio-frequency generator, being able to emit a reference beam and a measuring beam having different time frequencies;

(b) supplying the reference beam and the measuring beam emitted by the said cell to the optical system to be tested;

(c) detecting the light signal from the optical system to be tested by means of a detector able to transform this light signal into an electrical signal having a frequency signal equal to the difference of the time frequencies of the beams emitted by the Bragg cell and whose phase is characteristic of the wave surface distortions introduced by said systems; and (d) measuring the phase displacement between the phase of the electrical signal supplied by the detector and the phase of an electrical signal corresponding to the radio-frequency waves used for exciting the Bragg cell.

According to a first variant for performing the process according to the invention, a main light beam is supplied to the Bragg cell and the latter is excited by means of two radio-frequency waves of different frequencies, so as to produce the reference beam and the measuring beam by diffraction of the main beam.

According to a second variant of the process according to the invention, the reference beam and the measuring beam are supplied to the Bragg cell and the latter is excited by means of a single radio-frequency wave, so as to directly transmit the reference beam and transmit the measuring beam by diffraction.

According to a preferred embodiment of the process according to the invention, following stage b, the reference beam and the measuring beam from the optical system are reflected by means of a prism in the form of a corner cube, located in the image plane of the optical system to be tested, so that the direction of the reflected reference beam and the direction of the reflected measuring beam are respectively opposite to the direction of the incident reference beam and the direction of the incident measuring beam, which is followed by the detection of the light signal from the prism by means of the detector.

On exciting the Bragg cell by two radio-frequency waves, the frequency difference between the frequency of one of the radio-frequency waves and the frequency of the other radio-frequency wave can be constant. This constant difference leads to the transmission of an electrical signal, whose phase is equal to $d\phi(\nu)/d\nu$ where $\phi(\nu)$ represents the wave surface distortions due to the optical system to be tested and $\nu$ the optical frequency of the light signal. Following stage d, there is then an integration of the signal supplied by the measuring means using an integrator, in order to obtain the characteristic phase of said distortions.

According to another preferred embodiment of the process according to the invention, the frequency of the radio-frequency waves is continuously modified by direct action on the radio-frequency generator.

According to another preferred embodiment of the process according to the invention, before measuring the wave surface distortions introduced by the optical system to be tested, the apparatus is calibrated by determining the phase of the electrical signal supplied by the detector, said calibration being carried out in the absence of the optical system to be tested and by placing, either the slot, or the prism, or the detector, as a function of the embodiment, directly in the image plane of the lens used for supplying the reference and measuring beams to the optical system to be tested and emitted by the Bragg cell. In certain cases, the convergent lens can be replaced by another kind of deflection system.

BRIEF DESCRIPTION OF THE DRAWINGS

The invention is described in greater detail hereinafter relative to non-limitative embodiments and with reference to the attached drawings, in which.

DETAILED DESCRIPTION OF THE PREFERRED EMBODIMENTS

Figure 2:
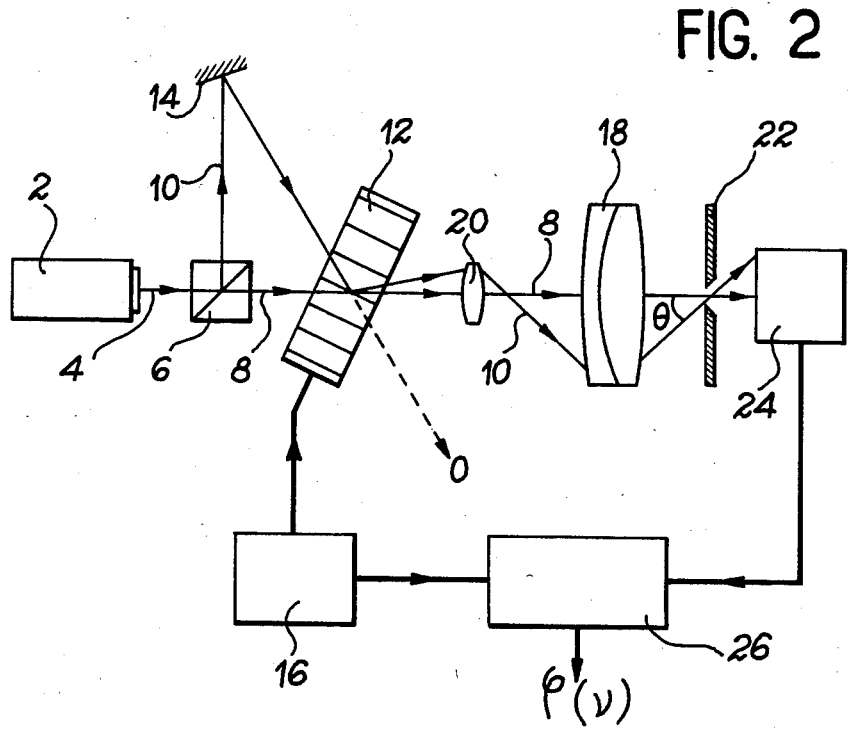
FIG. 2 diagrammatically, a first variant of the apparatus according to the invention, in which the Bragg cell receives a measuring beam and a reference beam, said cell being excited by a single radio-frequency wave.

FIG. 2 shows a first variant of the apparatus according to the invention, which more particularly comprises a light source 2 able to emit a main monochromatic coherent light beam 4 of time frequency $\nu_0$, which can for example be a laser, as well as means such as a beam dividing cube 6, which makes it possible to divide the light beam 4 into two light beams, namely a reference beam 8 and a measuring beam 10.

According to the invention, the apparatus also comprises a Bragg cell 12 able to receive the two light beams 8, 10, the measuring beam deflected by the dividing cube 6, being reflected in the direction of the cell by a reflecting mirror such as 14. This Bragg or acousto-optical cell is made from a quartz crystal coupled to a piezoelectric transducer. In this variant, the Bragg cell can be excited by a radio-frequency wave of frequency f, emitted by a radio-frequency generator 16. This excited cell 12 can directly transmit the reference beam 8, which then represents the time frequency $v_0$, whilst it diffracts the measuring beam 10, which then has a time frequency $v_0+f$, f being the excitation frequency of the cell.

The diffraction of measuring beam 10 is obtained by a modification of the refractive index of the cell, following the radio-frequency wave exciting the said cell. The lines shown in the Bragg cell represent the vibration planes or wave planes of the crystal and at which the measuring beam 10 can be diffracted.

The value of the excitation frequency f of the cell and consequently that of the spatial frequency of the exciting wave, can be continuously modified by a direct action on the radio-frequency generator 16. This spatial frequency $v$ can vary in a range of values between 0 and $v_c$, $v_c$ representing the cutoff frequency of optical system 18 which is to be tested, whereby said optical system can be a simple lens. Through the modification of the excitation frequency of the cell, it is possible to scan the complete surface of the optical system 18.

Figure 3:
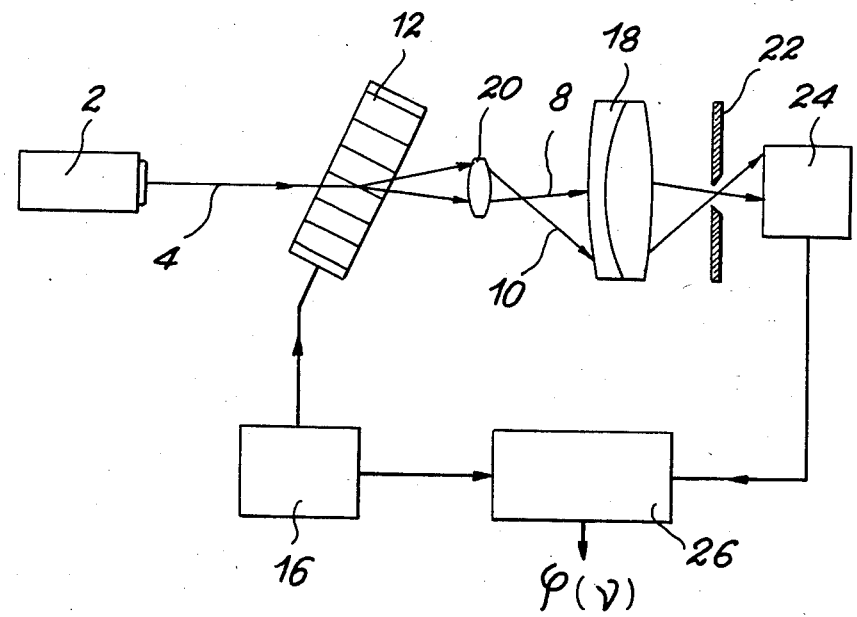
FIG. 3 diagrammatically, a second variant of the apparatus according to the invention, in which the Bragg cell is excited by two radio-frequency waves of different frequencies, one being fixed and the other variable.

FIG. 3 shows a second variant of the apparatus according to the invention which, as hereinbefore, comprises a light source 2 able to emit a main monochromatic, coherent light beam 4 having a time frequency $v_0$, which can e.g. be a laser, as well as a Bragg cell 12.

In the second variant, the Bragg cell 12 able to directly receive the main light beam 4, is excited by two radio-frequency waves emitted by a radio-frequency generator 16. One of the waves has a fixed frequency $f_0$, whilst the other has a frequency f, which can be continuously modified. The thus excited Bragg cell 12 can emit, by diffraction of the main beam 4, a first beam 8 serving as a reference beam and having a time frequency $v_0+f_0$ and a second light beam serving as a measuring beam 10 and having a time frequency $v_0+f$. The diffraction of the main beam by the Bragg cell is obtained as hereinbefore.

In this second variant, the radio-frequency wave of variable frequency f is such that: $f_0-(\Delta f)/2 < f < f_0+(\Delta f)/2$, $\Delta f$ being the pass band of the Bragg cell.

For the two variants described hereinbefore, the apparatus according to the invention also comprises a convergent lens 20 able to transmit in the direction of optical system 18 the reference beam 8 and the measuring beam 10 emitted by the Bragg cell. Moreover, lens 20 makes it possible to adapt the angular characteristics of the Bragg cell (diffraction angle of the light beams) with respect to those of the optical system to be tested (angle $\theta$).

Figure 1:
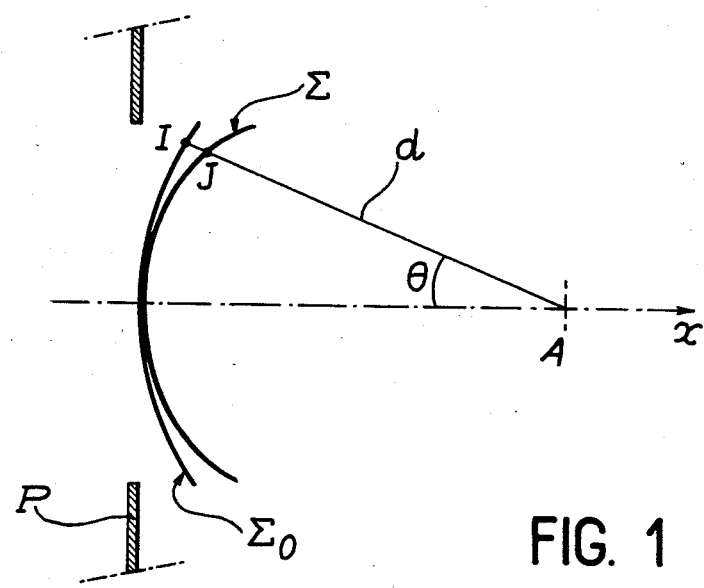
FIG. 1, already described, the wave surface distortions introduced by an optical system.

In addition, the apparatus according to the invention comprises a slot 22 placed in the image plane of the optical system to be tested. On the said slot 22, is formed a system of sinusoidal interference fringes from the two light beams 8 and 10, transmitted by optical system 18. In view of the fact that the two interfering light beams do not have the same time frequency $v_0$ (FIG. 1) or $v_0+f_0$ (FIG. 2) for the reference beam 8 and $v_0+f$ for the measuring beam 10, the interference fringes are translated or transferred at a uniform speed.

The light signal, resulting from the uniform translation of the interference fringes, can be collected by a detector 24, such as a photomultiplier, which transforms this light signal into an electrical signal having a frequency equal to the difference of the time frequencies of light beams 8 and 10 reaching the detector, i.e. of frequency f for the first variant and frequency f-fo for the second. This phase $\phi(v)$ of this electrical signal is characteristic of the wave surface distortions introduced by the optical system 18. This phase $\phi(v)$ can be measured by a device 26, which can e.g. be a phasemeter. Device 26 compares the phase of the electrical signal supplied by detector 24 and the phase of an electrical signal corresponding to the radio-frequency waves emitted by the radio-frequency generator 16. The electrical signal corresponding to the radio-frequency waves emitted by generator 16 is produced by the actual generator.

The measurement of the wave surface distortions introduced by an optical system takes place in the manner described hereinbefore. However, before measuring these distortions, it is necessary to calibrate the device, in order to ensure that the phase of the electrical signal supplied by detector 24 is indeed phase $\phi(v)$ characteristic of the optical system being tested. This calibration consists of measuring the phase introduced by the actual measuring apparatus, by placing slot 22 directly in the image plane of convergent lens 20 and specifically in the absence of the optical system to be tested.

Figure 4:
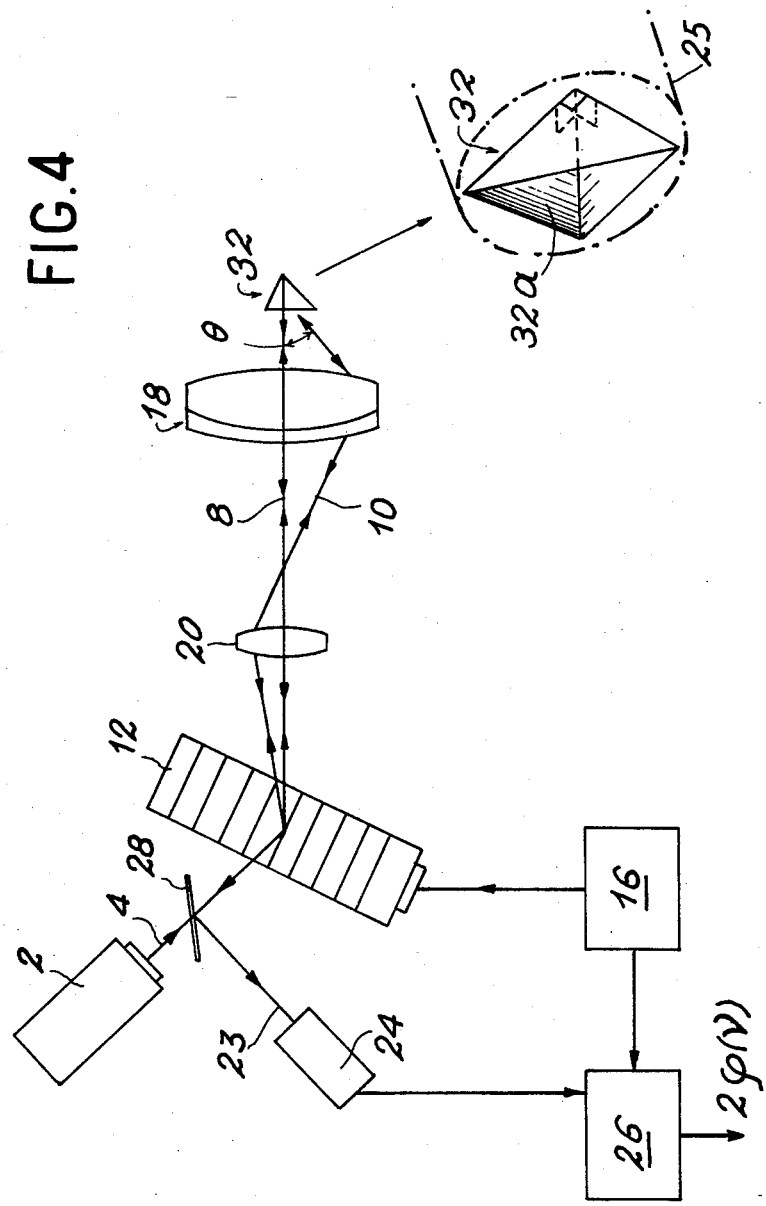
FIG. 4 diagrammatically, a third variant of the apparatus according to the invention, in which the corner cube prism is used for reflecting the measuring and reference beams onto the detector.

FIG. 4 shows a third variant of the apparatus according to the invention which comprises, as hereinbefore, a light source 2 able to emit a main monochromatic, coherent light beam 4 of time frequency $v_0$, which can e.g. be a laser, and a Bragg cell 12, which is able to receive the main light beam 4.

In this third variant, the Bragg cell 12 is excited by two radio-frequency waves emitted by a radio-frequency generator 16. One of these waves has a fixed frequency $f_0$ and the other a frequency f which can be modified in a continuous manner. The thus excited Bragg cell 12 can emit, by diffraction of main beam 4, a first beam 8 serving as a reference beam and having a time frequency $v_0+f_0$ and a second light beam serving as a measuring beam 10 and having a time frequency $v_0+f$. The diffraction of the main beam 4 by the Bragg cell is obtained as in the first variant.

The value of the excitation frequency f, and therefore that of the spatial frequency of the exciting wave, can be modified in a continuous manner by a direct action on the radio-frequency generator 16. This variable frequency f is such that:

$$f_0-(\Delta f)/2 < f < f_0+(\Delta f)/2$$

$\Delta f$ being the pass band of the Bragg cell.

The apparatus according to the invention also comprises a convergent lens 20 making it possible to transmit the reference beam 8 and the measuring beam 10 emitted by the Bragg cell, in the direction of optical system 18. As hereinbefore, lens 20 makes it possible to adapt the angular characteristics of the Bragg cell, as a function of those of the optical systems to be tested.

In this third variant, the apparatus according to the invention also comprises a prism 32 having the shape of a trihedral or corner cube located in the image plane of the optical system 18 to be tested. Prism 32 makes it possible to reflect the reference beam 8 and the measuring beam 10, so that the direction of the reference beam 8 reflected by prism 32 and the direction of the measuring beam 10 reflected by prism 32 are respectively opposite to the direction of the incident reference beam 8 and the direction of the incident measuring beam 10, no matter what the orientation of the incident beams.

Prism 32 can either be a solid glass corner cube using the total reflection principle, or a corner cube cut or hollowed out from a cylindrical glass block 25, like that shown in the drawing. In the latter case, the faces 32a of the hollowed-out corner cube can be treated so as to obtain a 100% reflecting power. For example, faces 32a can be metallized.

The reference and measuring beams reflected onto themselves again traverse the convergent lens 20 and the Bragg cell 12 (principle of the inverse return of light). The Bragg cell, excited by the radio-frequency waves respectively of fixed frequency fo and variable frequency f, produces, a secondary beam 23 coinciding with the main light beam 4, by diffraction of reference beam 8 and measuring beam 10, both of which are reflected. This secondary beam 23 is in fact formed from two light beams, one being a reference beam and the other a measuring beam, respectively having a time frequency $\nu_0+2f_0$ and $\nu_0+2f$.

Following the dividing of these two light beams, i.e. of the secondary beam 23, from the main beam 4 by means of a device 28 constituted e.g. by a semireflecting plate, the light signal can be collected by a detector 24, such as a photomultiplier, which transforms this signal into an electrical signal of frequency equal to the difference of the time frequencies of the light beams reaching the detector, i.e. of frequency 2 $(f-f_0)$. The phase 2 $\phi(\nu)$ of this electrical signal is characteristic of the wave surface distortions introduced by optical system 18. This phase 2 $\phi(\nu)$ which is dependent on the time frequency $\nu$ of the light wave transmitted by the optical system, $\nu$ being in this case equal to 2 $(f-f_o)$, can be measured by a device 26, such as a phase-meter. As hereinbefore, device 26 compares the phase of the electrical signal supplied by detector 24 and the phase of an electrical signal corresponding to the radio-frequency waves emitted by the radio-frequency generator 16. The electrical signal corresponding to the radio-frequency waves emitted by generator 16 is produced by the actual generator.

It should be noted that in this third variant of the apparatus according to the invention, the phase of the electrical signal emitted by detector 24 is double that of the electrical signal emitted by the detector, in the first and second variants of the apparatus. This is due to the fact that the optical system 18 to be tested is traversed twice by the reference and measuring beams.

The measurement of the wave surface distortions introduced by an optical system, using said third variant, takes place in the manner described hereinbefore. However, before measuring the distortions, it is necessary to calibrate the apparatus in order to ensure that the phase of the electrical signal, supplied by detector 24, is indeed the phase 2 $\phi(\nu)$, characteristic of the optical system which is to be tested. This calibration consists of measuring the phase introduced by the actual measuring apparatus, by placing the corner cube prism 32 directly in the image plane of the convergent lens 20, in the absence of the optical system to be tested. In this third variant, it is not envisaged to use two radio-frequency waves for exciting the Bragg cell, the latter only receiving the main beam 4 emitted by the light source 2. As in the first variant, it is possible to excite the Bragg cell by means of a single radio-frequency wave of variable frequency f, the cell then receiving the reference and measuring beams 8, 10 respectively.

Figure 5:
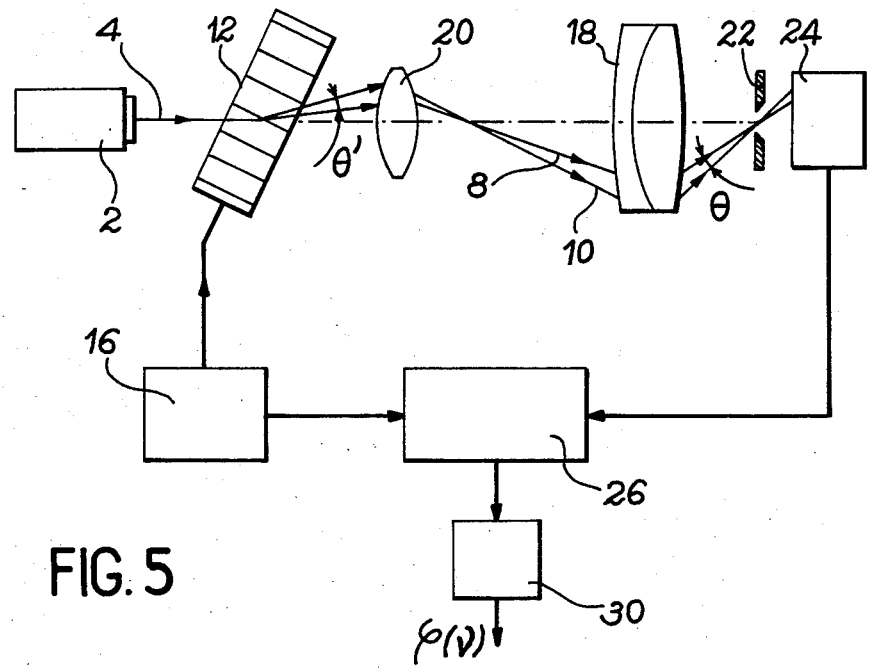
FIG. 5 diagrammatically, a fourth variant of the apparatus according to the invention, in which two radio-frequency waves of different frequencies are used, both of these frequencies being variable.
Figure 6:
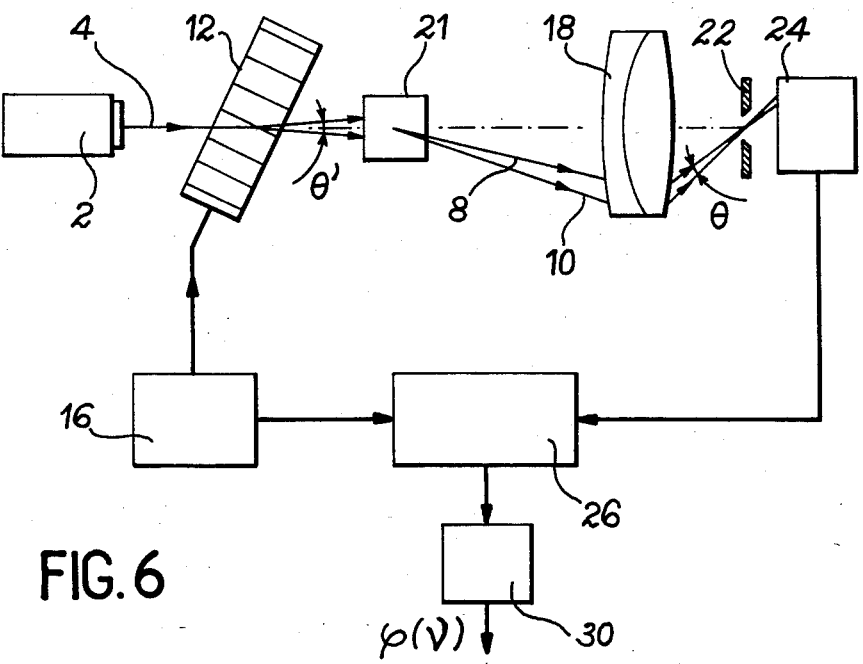
FIG. 6 diagrammatically, a fifth variant of the apparatus according to the invention, in which two radio-frequency waves are used, both these frequencies being constants.

FIGS. 5 and 6 respectively show fourth and fifth variants of the apparatus according to the invention. The apparatus comprises, as hereinbefore, a light source 2 able to emit a main monochromatic, coherent light beam 4 of time frequency $\nu_0$, which can e.g. be a laser, and a Bragg cell 12 able to receive the main light beam 4.

In these two variants, the Bragg cell 12 is excited by two radio-frequency waves emitted by a radio-frequency generator 16. One of these waves has a frequency $f_1$ and the other a frequency $f_2$, which differs from $f_1$. As hereinbefore, the thus excited Bragg cell can emit by diffraction of the main beam 4, a first beam 8 serving e.g. as a reference beam and having a time frequency $\nu_0+f_1$ and a second light beam serving e.g. as the measuring beam 10 and having a time frequency $\nu_0+f_2$.

In these two variants, the excitation frequencies of the Bragg cell, respectively, $f_1$ and $f_2$, are such that there difference is equal to a constant.

In the fourth variant, shown in FIG. 5, the two frequencies $f_1$ and $f_2$ are both variable frequencies. The value of these excitation frequencies, i.e. that of the spatial frequency of the corresponding exciting wave, can be continuously modified by direct action on the radio-frequency generator 16. The spatial frequency corresponding to each of the two excitation frequencies can vary in a range of values between 0 and $\theta_c$, $\theta_c$ representing the cutoff frequency of the optical system 18 to be tested and which can be a simple lens. As hereinbefore (first variant), through modifying the excitation frequencies of the cell it is possible to scan the complete surface of optical system 18.

In this fourth variant, the apparatus according to the invention comprises, as hereinbefore, a convergent lens 20 making it possible to transmit the reference beam 8 and the measuring beam 10, emitted by the Bragg cell, in the direction of optical system 18. Lens 20 makes it possible to adapt the angular characteristics of the Bragg cell with respect to those of the optical systems to be tested.

In the fifth variant shown in FIG. 6, the two frequencies $f_1$ and $f_2$ are fixed frequencies. As hereinbefore, the value of corresponding spatial frequence $\nu$ can be between 0 and $\nu_c$, $\nu_c$ being the cutoff frequency of the optical system 18.

In this fifth variant, the apparatus according to the invention comprises a deflection system 21 making it possible to transmit the reference beam 8 and the measuring beam 10, emitted by the Bragg cell, in the direction of the optical system 18 to be tested. The deflection system can be a unidirectional or bidirectional system constituted by a rotary mirror deflector, an acousto-optical deflector, etc.

According to the invention, for the two aforementioned variants, the difference between the two excitation frequencies, i.e. $f_1-f_2$, which is constant, is chosen in such a way that the angular separation $\theta'$ between reference beam 8 and measuring beam 10 from Bragg cell 12 is at least 100 times smaller than the aperture of the optical system 18 to be tested.

It should be noted that, compared with other variants of the apparatus according to the invention, either light beam 8 or reference beam 10 can serve as the reference beam or the measuring beam.

After traversing the optical system 18 to be tested, light beams 8 and 10 give rise to a system of sinusoidal interference fringes at a slot 22. Slot 22, which can be eliminated in certain cases, particularly when the angular separation $\theta'$ is small, is located in the image plane of the optical system to be tested. Bearing in mind that the two interfering light beams do not have the same time frequency, $\nu_0+f_1$ for beam 8 and $\nu_0+f_2$ for beam 10, the interference fringes are transferred at a uniform speed.

The light signal resulting from the uniform transfer of the interference fringes, can be collected by a detector 24 such as a photomultipler, which transforms this light signal into an electrical signal of frequency equal to the difference of the time frequencies of the light beams reaching the detector, i.e. of frequency $f_1-f_2$. The phase of this electrical signal is equal to $d\phi(\nu)/d\nu$ where $\phi(\nu)$ represents the wave form distortions due to the optical system to be tested and $\nu$ the optical frequency of the light signal. This phase can be measured by a device 26, e.g. a phase-meter.

As hereinbefore, device 26 compares the phase of the electrical signal supplied by detector 24 and the phase of an electrical signal corresponding to the radio-frequency waves emitted by the radio-frequency generator 16. The electrical signal corresponding to the radio-frequency waves emitted by generator 16 is produced by the actual generator.

The apparatus according to the invention also comprises an integrator 30, electrically connected to measuring device 26 and which makes it possible to integrate, with respect to frequency $\nu$, a signal supplied by device 26 in order to obtain phase $\phi(\nu)$ characteristic of the wave surface distortions introduced by the optical system.

The measurement of these distortions takes place in the manner described hereinbefore. However, before measuring the distortions, it is necessary to calibrate the apparatus in order to ensure that the phase of the electrical signal, supplied by detector 24, is indeed that permitting, after integration, the obtaining of phase $\phi(\nu)$ characteristic of the optical system which it is desired to test. This calibration consists of measuring the evolution of the phase introduced by the actual measuring device, by placing the detector 24 directly in the image plane of the convergence lens 20 for the fourth variant of the apparatus according to the invention (FIG. 5), or by placing detector 24 directly behind the deflection system 21 for the fifth variant (FIG. 6) in the absence of the optical system to be tested.

What is claimed is:

1. An apparatus for measuring the wave surface distortions introduced by an optical system having at least one lens, said apparatus comprising:
   emission means for emitting a main monochromatic and coherent light beam;
   a Bragg cell for receiving at least one beam from the emission means, said cell being excited by radio-frequency waves emitted by a radio-frequency generator, so as to emit a reference beam and a measuring beam having different time frequencies;
   transmitting means for supplying the reference beam and the measuring beam, emitted by the Bragg cell, to the optical system to be tested;
   detection means for transforming the light signal from the optical system into a electrical signal of frequency equal to the difference of the time frequencies of the beams emitted by the Bragg cell and whose phase is characteristic of the wave surface distortions introduced by said system; and
   measuring means for measuring the phase displacement between the phase of the electrical signal emitted by the detection means and the phase of an electrical signal corresponding to the radio-frequency waves used for exciting the Bragg cell.

2. A measuring apparatus according to claim 1, wherein the Bragg cell is excited by two radio-frequency waves of different frequencies, so as to produce the reference beam and the measuring beam by diffraction of the main beam.

3. A measuring apparatus according to claim 1, wherein it comprises splitting means for splitting the main beam into a reference beam and a measuring beam and the Bragg cell is excited by a single radio-frequency wave, so as to directly transmit the reference beam and transmit the measuring beam by diffraction.

4. A measuring apparatus according to claim 3, wherein the splitting means are constituted by a beam dividing cube.

5. A measuring apparatus to claim 3, wherein it also comprises, following the splitting means, means making it possible to reflect the measuring beam in the direction of the Bragg cell, said beam being deflected by the dividing means.

6. A measuring apparatus according to claim 1, wherein it also comprises a slot located in the image plane of the optical system to be tested.

7. A measuring apparatus according to claim 1, wherein the means making it possible to transmit the reference and measuring beams, emitted by the Bragg cell, in the direction of the optical system to be tested, are also constituted by at least one convergent lens.

8. A measuring apparatus according to claim 1, wherein it also comprises a prism in the form of a corner cube located in the image plane of the optical system to be tested, which makes it possible to reflect the reference beam and the measuring beam towards the detection means, the direction of the reflected reference beam and the direction of the reflected measuring beam being respectively opposite to the direction of the incident reference beam and the direction of the incident measuring beam.

9. A measuring apparatus according to claim 8, wherein the Bragg cell is excited by two radio-frequency waves of different frequencies, so as to produce, by diffraction of the main beam, the reference beam and the measuring beam.

10. A measuring apparatus according to claim 8, wherein said Bragg cell is excited by two radio-frequency waves and produces, by diffraction of the reference beam and the measuring beam reflected by the prism, a secondary beam which coincides with the main beam, wherein said apparatus further comprises a splitting means for splitting said secondary beam and said main beam wherein said splitting means is provided in order to transmit the secondary beam to said detection means.

11. A measuring apparatus according to claim 10, wherein the splitting means of the secondary beam and the main beam are constituted by a semireflecting plate.

12. A measuring apparatus according to claim 8, wherein the transmitting means for transmitting the reference and measuring beams emitted by the Bragg cell in the direction of an optical system to be tested comprises at least one convergent lens.

13. A measuring apparatus according to claim 2, wherein the frequency difference between the frequency of one of the radio-frequency waves and the frequency of the other radio-frequency wave is constant, said constant difference leading to the emission of an electrical signal, by the detection means, whose phase is equal to $d\phi(\nu)/d\nu$ where $\phi(\nu)$ represents the wave surface distortions due to the optical system to be tested and $\nu$ the optical frequency of the light signal, whereby following the measuring means, the apparatus comprises means making it possible to integrate the signal supplied by the measuring means in order to obtain the characteristic phase of said distortions.

14. A measuring apparatus according to claim 13, wherein the difference between the two frequencies is such that the angular separation value ($\theta''$) between the reference beam and the measuring beam from the Bragg cell is at least 100 times smaller than the aperture of the optical system to be tested.

15. A measuring apparatus according to claims 13, wherein the radio-frequency generator emits two variable frequencies.

16. A measuring apparatus according to claims 13, wherein the radio-frequency generator emits two fixed frequencies.

17. A measuring apparatus according to claim 15, wherein the means making it possible to transmit the reference and measuring beams, emitted by the Bragg cell, in the direction of the optical system to be tested are constituted by at least one convergent lens.

18. A measuring apparatus according to claim 16, wherein the means making it possible to transmit the reference and measuring beams, emitted by the Bragg cell, in the direction of the optical system to be tested are constituted by a deflection system.

19. A measuring apparatus according to claim 13, wherein it also comprises a slot located in the image plane of the optical system to be tested.

20. A measuring apparatus according to claim 1, wherein the means emitting the main monochromoatic, coherent light beam are constituted by a laser.

21. A measuring apparatus according to claim 1, wherein the measuring means are constituted by a phase-meter.

22. A process for measuring wave surface distortions introduced by an optical system, wherein it comprises:
(a) directing onto a Bragg cell at least one monochromatic, coherent light beam, said cell, excited by radio-frequency waves emitted by the radio-frequency generator, being able to emit a reference beam and a measuring beam having different time frequencies;
(b) supplying the reference beam and the measuring beam emitted by the said cell to the optical system to be tested;
(c) detecting the light signal from the optical system to be tested by means of a detector able to transform this light signal into an electrical signal having a frequency signal equal to the difference of the time frequencies of the beams emitted by the Bragg cell and whose phase is characteristic of the wave surface distortions introduced by said systems; and
(d) measuring the phase displacement between the phase of the electrical signal supplied by the detector and the phase of an electrical signal corresponding to the radio-frequency waves used for exciting the Bragg cell.

23. A measuring process according to claim 22, wherein a main light beam is supplied to the Bragg cell and the latter is excited by means of two radio-frequency waves of different frequencies, so as to produce the reference beam and the measuring beam by diffraction of the main beam.

24. A measuring process according to claim 22, wherein the reference beam and the measuring beam are supplied to the Bragg cell and the latter is excited by means of a single radio-frequency wave, so to directly transmit the reference beam and transmit the measuring beam by diffraction.

25. A measuring process according to claims 22, wherein, before measuring the wave surface distortions introduced by the optical systems to be tested, the apparatus is calibrated by determining the phase of the electrical signal emitted by the detector, said calibration being performed in the absence of the optical system to be tested and by placing a slot directly in the image plane of a convergent lens used for supplying to the optical system to be tested, the reference and measuring beams, emitted by the Bragg cell.

26. A measuring process according to claim 22, wherein following stage b, the reference beam and the measuring beam from the optical system are reflected by means of a prism in the form of a corner cube, located in the image plane of the optical system to be tested, so that the direction of the reflected reference beam and the direction of the reflected measuring beam are respectively opposite to the direction of the incident reference beam and the direction of the incdient measuring beam, which is followed by the detection of the light signal from the prism by means of the detector.

27. A measuring process according to claim 26, wherein a main light beam is supplied to the Bragg cell and wherein the latter is excited by means of two radio-frequency waves of different frequencies, in such a way as to produce the reference beam and the measuring beam by diffraction of the main beam.

28. A measuring process according to claim 27, wherein the Bragg cell, excited by the two radio-frequency waves, is able to produce by diffraction of the reference and measuring beams reflected by the prism, a secondary beam which coincides with the main beam, the secondary beam is separated from the main beam in such a way as to supply the secondary beam to the detection means.

29. A measuring process according to claims 26, wherein, before measuring the wave surface distortions introduced by the optical system to be tested, the apparatus is calibrated by determining the evolution of the phase of the electrical signal transmitted by the detector, said calibration being performed in the absence of the optical system to be tested and by placing the prism directly in the image plane of a convergent lens used for supplying to the optical system to be tested the reference and meauring beams emitted by the Bragg cell.

30. A measuring process according to claim 23, wherein the frequency difference between the frequency of one of the radio-frequency waves and the frequency of the other radio-frequency wave is constant, so that this constant difference leads to the transmission, by the detector, of an electrical signal whose phase is equal to $d\phi(\nu)/d$ where $\phi(\nu)$ represents the wave surface distortions due to the optical system to be tested and wherein $\nu$ represents the optical frequency of the light signal and, after stage d, there is an integration of the signal supplied by the measuring means using an integrator in order to obtain the phase difference which is the characteristic of said distortions.

31. A measuring process according to claim 30, wherein before measuring the wave surface distortions introduced by the optical system to be tested, the apparatus is calibrated by determining the evolution of the phase of the electrical signal supplied by the detector, said calibration being performed in the absence of the optical system to be tested and by placing the detector directly in the image plane of a convergent lens used for supplying to the optical system to be tested, the reference and measuring beams emitted by the Bragg cell.

32. A measuring process according to claim 30, wherein, befoe measuring the wave surface distortions introduced by the optical system to be tested, the apparatus is calibrated by determining the evolution of the phase of the electrical signal supplied by the detector, said calibration being performed in the absence of the optical system to be tested and by placing the detector directly behind a deflection system used for supplying to the optical system to be tested, the reference and measuring beams emitted by the Bragg cell.

33. A measuring process according to claim 22, wherein the frequency of the radio-frequency waves is continuously modified by direct action on the radio-frequency generator.

* * * * *